(12) United States Patent
McCann et al.

(10) Patent No.: US 8,943,552 B2
(45) Date of Patent: *Jan. 27, 2015

(54) METHODS AND APPARATUS TO DISCOVER AUTHENTICATION INFORMATION IN A WIRELESS NETWORKING ENVIRONMENT

(75) Inventors: Stephen McCann, Southampton (GB); Michael Montemurro, Toronto (CA)

(73) Assignee: BlackBerry Limited, Waterloo, Ontario (CA)

(*) Notice: Subject to any disclaimer, the term of this patent is extended or adjusted under 35 U.S.C. 154(b) by 465 days.

This patent is subject to a terminal disclaimer.

(21) Appl. No.: 12/504,500

(22) Filed: Jul. 16, 2009

(65) Prior Publication Data

US 2010/0275249 A1    Oct. 28, 2010

Related U.S. Application Data

(60) Provisional application No. 61/172,597, filed on Apr. 24, 2009.

(51) Int. Cl.
*H04L 29/06* (2006.01)
*H04W 12/06* (2009.01)
(Continued)

(52) U.S. Cl.
CPC .............. *H04W 12/06* (2013.01); *H04L 63/08* (2013.01); *H04W 48/14* (2013.01); *H04W 88/08* (2013.01)
USPC ............................ 726/4; 726/2; 726/3; 726/5

(58) Field of Classification Search
CPC ................................ H04L 63/08; H04W 12/06
USPC .................................................. 726/4, 2, 3, 5
See application file for complete search history.

(56) References Cited

U.S. PATENT DOCUMENTS

| 5,796,727 A | 8/1998 | Harrison et al. |
| 6,081,826 A | 6/2000 | Masuoka et al. |

(Continued)

FOREIGN PATENT DOCUMENTS

| CA | 2244366 | 3/1999 |
| CN | 1578533 | 2/2005 |

(Continued)

OTHER PUBLICATIONS

Messerges et al.; A security design for a general purpose, self-organizing, multihop ad hoc wireless network; Published in: Proceeding SASN '03 Proceedings of the 1st ACM workshop on Security of ad hoc and sensor networks; pp. 1-11; ACM New York, NY, USA ; 2003; ACM Digital Library.*

(Continued)

*Primary Examiner* — Bradley Holder
(74) *Attorney, Agent, or Firm* — Hanley, Flight and Zimmerman, LLC

(57) ABSTRACT

Example methods and apparatus to discover authentication information in a wireless networking environment are disclosed. A disclosed example method involves transmitting a request message to a network access point requesting identifiers indicative of authentication information required by the network access point to authenticate a wireless terminal. In addition, at least one authentication requirement identifier is retrieved from a response message transmitted by the network access point. The at least one authentication requirement identifier is indicative of an authentication value obtainable using operations performed by the wireless terminal at a media access control layer without providing access to an internet protocol layer to retrieve the authentication value.

17 Claims, 9 Drawing Sheets

(51) Int. Cl.
*H04W 48/14* (2009.01)
*H04W 88/08* (2009.01)

(56) References Cited

U.S. PATENT DOCUMENTS

| | | | |
|---|---|---|---|
| 6,393,261 | B1 | 5/2002 | Lewis |
| 6,643,517 | B1 | 11/2003 | Steer |
| 6,845,246 | B1 | 1/2005 | Steer |
| 6,950,419 | B1 | 9/2005 | Park et al. |
| 6,950,876 | B2 | 9/2005 | Bright et al. |
| 7,395,083 | B2 | 7/2008 | Buckley |
| 7,418,591 | B2 | 8/2008 | Tachikawa |
| 7,551,892 | B1 | 6/2009 | Elliott |
| 7,606,202 | B2 | 10/2009 | Marathe et al. |
| 7,664,511 | B2 | 2/2010 | Wang et al. |
| 7,707,418 | B2 | 4/2010 | Tsushima et al. |
| 8,055,306 | B2 | 11/2011 | Li |
| 8,391,828 | B2 | 3/2013 | Kim et al. |
| 2002/0029108 | A1 | 3/2002 | Liu et al. |
| 2002/0081995 | A1* | 6/2002 | Leppinen et al. ............ 455/412 |
| 2002/0115465 | A1 | 8/2002 | Komatsu |
| 2002/0135515 | A1 | 9/2002 | Rankin et al. |
| 2002/0136226 | A1 | 9/2002 | Christoffel et al. |
| 2002/0169883 | A1 | 11/2002 | Bright et al. |
| 2002/0183060 | A1 | 12/2002 | Ko et al. |
| 2002/0191575 | A1 | 12/2002 | Kalavade et al. |
| 2002/0198849 | A1* | 12/2002 | Piikivi ............................ 705/76 |
| 2003/0026223 | A1 | 2/2003 | Eriksson et al. |
| 2003/0028763 | A1 | 2/2003 | Malinen et al. |
| 2003/0031148 | A1 | 2/2003 | Schmidt et al. |
| 2003/0119481 | A1 | 6/2003 | Haverinen et al. |
| 2003/0133421 | A1 | 7/2003 | Sundar et al. |
| 2003/0134650 | A1 | 7/2003 | Sundar et al. |
| 2004/0066756 | A1 | 4/2004 | Ahmavaara et al. |
| 2004/0181692 | A1 | 9/2004 | Wild et al. |
| 2005/0021959 | A1* | 1/2005 | Tsushima et al. ............ 713/170 |
| 2005/0059397 | A1 | 3/2005 | Zhao |
| 2005/0094593 | A1 | 5/2005 | Buckley |
| 2005/0114448 | A1 | 5/2005 | Skomra |
| 2005/0232209 | A1 | 10/2005 | Buckley et al. |
| 2006/0035639 | A1 | 2/2006 | Etemad et al. |
| 2006/0233198 | A1* | 10/2006 | Kim et al. ...................... 370/469 |
| 2006/0268802 | A1* | 11/2006 | Faccin ........................... 370/338 |
| 2007/0047491 | A1* | 3/2007 | Dutta et al. .................... 370/331 |
| 2007/0070935 | A1 | 3/2007 | Prakash et al. |
| 2007/0189218 | A1* | 8/2007 | Oba et al. ....................... 370/331 |
| 2007/0204155 | A1* | 8/2007 | Dutta et al. ................... 713/168 |
| 2007/0211676 | A1 | 9/2007 | Sharma et al. |
| 2007/0213046 | A1 | 9/2007 | Li et al. |
| 2007/0224988 | A1 | 9/2007 | Shaheen |
| 2008/0069065 | A1* | 3/2008 | Wu et al. ........................ 370/340 |
| 2008/0070544 | A1 | 3/2008 | Lior |
| 2008/0151796 | A1* | 6/2008 | Jokela ............................ 370/310 |
| 2008/0276303 | A1* | 11/2008 | Gast .................................. 726/3 |
| 2008/0287141 | A1 | 11/2008 | Vogel et al. |
| 2008/0298333 | A1* | 12/2008 | Seok .............................. 370/338 |
| 2008/0310366 | A1* | 12/2008 | Oba et al. ...................... 370/331 |
| 2009/0010399 | A1* | 1/2009 | Kim et al. ........................ 379/45 |
| 2009/0022076 | A1 | 1/2009 | Canpolat et al. |
| 2009/0046657 | A1* | 2/2009 | Kim et al. ..................... 370/331 |
| 2009/0046682 | A1 | 2/2009 | Kim et al. |
| 2009/0225731 | A1* | 9/2009 | Kneckt et al. ................ 370/338 |
| 2009/0232042 | A1* | 9/2009 | Kneckt et al. ................ 370/312 |
| 2009/0245133 | A1* | 10/2009 | Gupta et al. .................. 370/254 |
| 2009/0245199 | A1 | 10/2009 | Pathan et al. |
| 2009/0268652 | A1* | 10/2009 | Kneckt et al. ................ 370/311 |
| 2009/0274094 | A1* | 11/2009 | Engwer ......................... 370/328 |
| 2009/0279449 | A1* | 11/2009 | Kneckt et al. ................ 370/253 |
| 2009/0298522 | A1 | 12/2009 | Chaudhri et al. |
| 2010/0008337 | A1* | 1/2010 | Bajko ............................ 370/338 |
| 2010/0034097 | A1 | 2/2010 | Nitta et al. |
| 2010/0046440 | A1 | 2/2010 | Singh |
| 2010/0146272 | A1* | 6/2010 | Centonza et al. ............. 713/168 |
| 2010/0153001 | A1 | 6/2010 | Bauchot et al. |
| 2010/0198952 | A1* | 8/2010 | Kneckt et al. ................ 709/223 |
| 2010/0246506 | A1 | 9/2010 | Krishnaswamy |
| 2010/0255794 | A1 | 10/2010 | Agnew |
| 2010/0265871 | A1 | 10/2010 | Ko et al. |
| 2011/0164596 | A1 | 7/2011 | Montemurro et al. |
| 2011/0282945 | A1 | 11/2011 | Thyni et al. |
| 2012/0017267 | A1 | 1/2012 | McCann et al. |

FOREIGN PATENT DOCUMENTS

| | | |
|---|---|---|
| EP | 1096728 | 5/2001 |
| JP | 2004072682 | 3/2004 |
| JP | 2004531710 | 10/2004 |
| JP | 2005018424 | 1/2005 |
| JP | 2005341621 | 12/2005 |
| JP | 2008067229 | 3/2008 |
| JP | 2008543247 | 11/2008 |
| JP | 2009525664 | 7/2009 |
| JP | 2009525666 | 7/2009 |
| JP | 2010529730 | 8/2010 |
| JP | 2010532619 | 10/2010 |
| KR | 1020090065089 | 6/2009 |
| WO | 02/18877 | 3/2002 |
| WO | 2004/064306 A2 | 7/2004 |
| WO | 2004/077753 | 9/2004 |
| WO | 2005027556 | 3/2005 |
| WO | 2005/094011 A2 | 10/2005 |
| WO | 2006/089847 | 8/2006 |
| WO | 2006132487 | 12/2006 |
| WO | 2007/089109 | 8/2007 |
| WO | 2007/089111 | 8/2007 |
| WO | 2008/107306 | 9/2008 |
| WO | 2008129659 | 10/2008 |
| WO | 2008129716 | 10/2008 |
| WO | 2008/147130 | 12/2008 |
| WO | 2009/005282 | 1/2009 |
| WO | 2009/018300 | 2/2009 |
| WO | 2009018300 | 2/2009 |
| WO | 2009/027853 A1 | 3/2009 |
| WO | 2009/031197 | 3/2009 |
| WO | 2009/032554 | 3/2009 |
| WO | 2009/078540 | 6/2009 |
| WO | 2009078540 | 6/2009 |
| WO | 2009134288 | 11/2009 |
| WO | 2009/156554 | 12/2009 |
| WO | 2011/007338 A1 | 1/2011 |

OTHER PUBLICATIONS

Hartl et al.; Engineering multimedia-aware personalized ubiquitous services; Published in: Multimedia Software Engineering, 2002. Proceedings. Fourth International Symposium on Date of Conference: 2002 pp. 344-351; IEEE Xplore.*

Patent Cooperation Treaty, "Written Opinion of the International Searching Authority," issued by the International Searching Authority in connection with PCT application No. PCT/GB2010/000834 mailed Jan. 17, 2011 (7 pages).

Patent Cooperation Treaty, "International Search Report," issued by the International Searching Authority in connection with PCT application No. PCT/GB2010/000834, mailed Jan. 17, 2011 (4 pages).

Arkko et al, "Network Discovery and Selection Problem," rfc5113, IETF Standard, Internet Engineering Task Force, IETF, Jan. 1, 2008, XP015055182, ISSN: 0000-0003, pp. 1-39.

Canpolat et al, "IEEE 802.11u Network Selection & MIH Support," Sep. 19, 2006, pp. 1-19, XP002478803 [Retrieved from: URL: https://mentor.ieee.org/802.11/dcn/06/11-06-1069-00-000u-tgu-overview.ppt].

Patent Cooperation Treaty, "Written Opinion of the International Preliminary Examining Authority," issued by the International Preliminary Examining Authority in connection with related PCT application No. PCT/GB2010/000834, mailed Jul. 18, 2011 (5 pages).

802.11 Working Group of the 802 Committee, "Draft Standard for Information Technology—Telecommunications and information exchange between systems—Local and metropolitan area networks—Specific Requirements," IEEE P802.11u/D6.0, published Apr. 9, 2009, IEEE Standards, New York, NY, USA, 208 pages.

(56) References Cited

OTHER PUBLICATIONS

Haverinen et al., "Extensible Authentication Protocol Method for Global System for Mobile Communications (GSM) Subscriber Identity Modules (EAP-SIM); rfc4186.txt", IETF Standard, Internet Engineering Task Force, IETF, CH, Jan. 2006, 92 pages.
Patent Cooperation Treaty, "International Preliminary Report on Patentability," issued by the International Preliminary Examining Authority in connection with PCT application No. PCT/GB2010/000834, issued on Sep. 5, 2011 (27 pages).
Lloyd et al., "PPP Authentication Protocols," Network Working Group, Request for Comments (RFC) 1334, Oct. 1992, 16 pages.
Simpson, W., "PPP Challenge Handshake Authentication Protocol (CHAP)," Network Working Group, Request for Comments (RFC) 1994, Aug. 1996, 13 pages.
Zorn et al., "Microsoft PPP CHAP Extensions," Network Working Group, Request for Comments (RFC) 2433, Oct. 1998, 20 pages.
Zorn, G., "Microsoft PPP CHAP Extensions, Version 2," Network Working Group, Request for Comments (RFC) 2759, Jan. 2000, 20 pages.
Aboba et al., "Extensible Authentication Protocol (EAP)," Network Working Group, Request for Comments (RFC) 3748, Jun. 2004, 67 pages.
Aboba et al., "The Network Access Identifier," Network Working Group, Request for Comments (RFC) 4282, Dec. 2005, 16 pages.
Berners-Lee et al., "Uniform Resource Identifier (URI): Generic Syntax," Network Working Group, Request for Comments (RFC) 3986, Jan. 2005, 61 pages.
International Standard ISO/IEC 8802.11, "Information technology—Telecommunications and information exchange between systems—Local and metropolitan area networks—Specific requirements; Part 11: Wireless LAN Medium Access Control (MAC) and Physical Layer (PHY) specifications; Amendment 6: Medium Access Control (MAC) Security Enhancements," ISO/IEC 8802-11:2005/Amd.6:2006(E), IEEE STD 802.11i-2004 (Amendment to IEEE Std 802.11-1999), Dec. 15, 2006, 197 pages.
United States Patent and Trademark Office, "Non-Final Office Action," issued in connection with U.S. Appl. No. 13/244,734, on Dec. 12, 2011 (35 pages).
Hilt et al., "A Framework for Session Initiation Protocol (SIP) Session Policies," SIPPING Working Group, Internet-Draft, Nov. 1, 2008, [retrieved from http://tools.ietf.org/html/draft-ietf-sip-session-policy-framework-05 on Dec. 27, 2010], 36 pages.
"Extensible Authentication Protocol," From Wikipedia, the free encyclopedia, [retrieved from http://en.wikipedia.org/wiki/Extensible_Authenitcation_Protocol on Dec. 27, 2010], Dec. 8, 2010, 8 pages.
"Extensible Authentication Protocol," From Wikipedia, the free encyclopedia, [retrieved from http://en.wikipedia.org/w/index.php?title=Extensible_Authentication_Protocol&oldid=297168642 on Dec. 27, 2010], Jun. 18, 2009, 7 pages.
Petrie et al., "A Framework for Session Initiation Protocol User Agent Profile Delivery," SIPPING, Internet-Draft, Feb. 13, 2008, [retrieved from http://tools.ietf.org/html/draft-ietf-sipping-config-framweork-15 on Dec. 27, 2010], 56 pages.
Hilt et al., "A User Agent Profile Data Set for Media Policy," SIPPING Working Group, Internet-Draft, Jul. 12, 2008, [retrieved from http://tools.ietf.org/html/draft-ietf-sipping-media-policy-dataset-06 on Dec. 27, 2010], 36 pages.
Hilt et al., "A Framework for Session Initiation Protocol (SIP) Session Policies," SIPPING Working Group, Internet-Draft, Apr. 27, 2008, [retrieved from http://tools.ietf.org/html/draft-ietf-sip-session-policy-framework-03 on Dec. 27, 2010], 36 pages.
Hilt et al., "A Session Initiation Protocol (SIP) Event Package for Session-Specific Session Policies," SIPPING Working Group, Internet-Draft, Jul. 12, 2008, [retrieved from http://tools.ietf.org/id/draft-ietf-sipping-policy-package-05],37 pages.
Hilt et al., "A Session Initiation Protocol (SIP) Event Package for Session-Specific Session Policies," SIPPING Working Group, Internet-Draft, Jan. 28, 2007, [retrieved from http://tools.ietf.org/html/draft-ietf-sipping-policy-package-03 on Dec. 27, 2010], 18 pages.
802.11 Working Group of the 802 Committee, "Draft Standard for Information Technology—Telecommunications and information exchange between systems—Local and metropolitan area networks—Specific Requirements," IEEE P802.11u/D7.0, published Jun. 2009, IEEE Standards, New York, NY, USA, 197 pages.
Rigney et al., "Remote Authentication Dial in User Service (RADIUS)," Network Working Group, Request for Comments: 2865, Jun. 2000, 77 pages.
Calhoun et al., "Diameter Base Protocol," Network Working Group, Request for Comments: 3588, Sep. 2003, 147 pages.
Kawatsura, Y., "Secure Electronic Transaction (SET) Supplement for the v1.0 Internet Open Trading Protocol (IOTP)," Network Working Group, Request for Comments: 3538, Jun. 2003, 57 pages.
Cam-Winget et al., "Dynamic Provisioning Using Flexible Authentication via Secure Tunneling Extensible Authentication Protocol (EAP-FAST)," Network Working Group, Request for Comments: 5422, Mar. 2009, 40 pages.
Roach, A.B., "Session Initiation Protocol (SIP)—Specific Event Notification," Network Working Group, Request for Comments: 3265, Jun. 2002, 38 pages.
Schulzrinne, H., "CIPID: Contact Information for the Presence Information Data Format," Network Working Group, Request for Comments: 4482, Jul. 2006, 12 pages.
Aboba et al., "Extensible Authentication Protocol (EAP) Key Management Framework," Network Working Group, Request for Comments: 5247, Aug. 2008, 80 pages.
Rosenberg et al., "SIP: Session Initiation Protocol," Network Working Group, Request for Comments: 3261, Jun. 2002, 270 pages.
Blunk et al., "PPP Extensible Authentication Protocol (EAP)," Network Working Group, Request for Comments: 2284, Mar. 1998, 16 pages.
Townsley et al., "Layer Two Tunneling Protocol 'L2TP'," Network Working Group, Request for Comments: 2661, Aug. 1999, 81 pages.
Stanley et al., "Extensible Authentication Protocol (EAP) Method Requirements for Wireless LANs," Network Working Group, Request for Comments: 4017, Mar. 2005, 12 pages.
Kempf et al., "Distributing a Symmetric Fast Mobile Ipv6 (FMIPv6) Handover Key Using Secure Neighbor Discovery (SEND)," Network Working Group, Request for Comments: 5269, Jun. 2008, 15 pages.
Kempf et al., "Distributing a Symmetric Fast Mobile IPv6 (FMIPv6) Handover Key using Secure Neighbor Discovery (SEND)," Network Working Group, Request for Comments: 5108, Jan. 2008, 15 pages.
United States Patent and Trademark Office, "Final Office Action," issued in connection with U.S. Appl. No. 13/244,734, on Apr. 25, 2012 (37 pages).
United States Patent and Trademark Office, "Advisory Action," issued in connection with U.S. Appl. No. 13/244,734, on Jul. 5, 2012 (3 pages).
Mexican Institute of Industrial Property, "Notice fo Allowance," issued in connection with Mexican Patent Application No. MX/a/2011/011194, on Feb. 11, 2014 (1 page).
Australian Government, IP Australia, "Notice of Acceptance," issued in connection with Australian Patent Application No. 2010240692, on Apr. 4, 2014 (2 pages).
Korean Intellectual Property Office, "Notice of Allowance of Patent," issued in connection with Korean Patent Application No. 10-2011-7025004, on Feb. 26, 2014 (3 pages).
Canadian Intellectual Property Office, "Examination Report," issued in connection with Canadian Patent Application No. 2,759,579, on Jul. 5, 2013 (4 pages).
Korean Intellectual Property Office, "Office Action," issued in connection with Korean Patent Application No. 10-2011-7025004, on Aug. 20, 2013 (19 pages).
Mexican Institute of Industrial Property, "Office Action," issued in connection with Mexican Patent Application No. Mx/a/2011/011194, on Jun. 19, 2013 (5 pages).
"IEEE Standard for Local and Metropolitan Area Networks—Part 21: Media Independent Handover Services," IEEE Computer Society, IEEE Std 802.21, Jan. 21, 2009, 323 pages.

(56) References Cited

OTHER PUBLICATIONS

Celebi et al., "Utilization of Location Information in Cognitive Wireless Networks," IEEE Wireless Communications, Aug. 1, 2007, 8 pages.

Gurney et al., "Geo-Location Database Techniques for Incumbent Protection in the TV White Space," New Frontiers in Dynamic Spectrum Access Networks, 2008, DYSPAN 2008, 3rd IEEE Symposium on, IEEE, Piscataway, NJ, USA, Oct. 14, 2008, pp. 1-9.

Funk et al., "Extensible Authentication Protocol Tunneled Transport Layer Security Authenticated Protocol Version 0 (EAP-TTLSv0)," Network Working Group, Request for Comments 5281, Aug. 2008, 52 pages.

Cam-Winget et al., "The Flexible Authentication via Secure Tunneling Extensible Authentication Protocol Method (EAP-FAST)," Network Working Group, Request for Comments 4851, May 2007, 64 pages.

"Analysis of Network Selection Methods," 3GPP TSG-SA WG2 meeting #32, San Diego, California, USA, May 12, 2003, 2 pages.

"WLAN Access Network Selection," 3GPP TSG-SA WG2 meeting #35, Bangkok, Thailand, Oct. 27, 2003, 3 pages.

Haverinen et al. "Cellular Access Control and Charging Mobile Operator Wireless Local Area Networks," Dec. 2002, IEEE Productions, 10 pages.

Haverinen et al. "EAP SIM Authentication," Network Working Group, Online 1, Oct. 27, 2003, pp. 1-72.

"Universal Mobile Telecommunications System (UMTS); LTE; 3GPP System to Wireless Local Area Network (WLAN) Interworking; WLAN User Equipment (WLAN UE) to Network Protocls; Stage 3 (3GPP TS 24.234 version 8.2.0 Release 8)," ETSI TS 124 234, V8.2.0, Apr. 15, 2009, 40 pages.

Japanese Patent Office, "Notice of Reasons for Rejection," issued in connection with Japanese Patent Application No. 2012-506568, on Mar. 28, 2013 (15 pages).

IP Australia, "Patent Examination Report No. 1," issued in connection with Australian Patent Application No. 2010240692, on May 24, 2013 (3 pages).

Mexican Institute of Industrial Property, "Office Action," issued in connection with Mexican Patent Application No. MX/a/2011/011194, on Oct. 18, 2013 (4 pages).

Japanese Patent Office, "Notice of Allowance," issued in connection with Japanese Patent Application No. 2012-506568, on Dec. 18, 2014 (3 pages).

State Intellectual Property Office of People's Republic of China, "First Office Action," issued in connection with Chinese Application No. 201080017723.2, on Nov. 5, 2013 (8 pages).

Canadian Intellectual Property Office, "Examination Report," issued in connection with Canadian Application No. 2,759,579, May 15, 2014 (2 pages).

State Intellectual Property Office of People's Republic of China, "Office Action," issued in connection with Chinese Patent Application No. 201080017723.2, Jul. 23, 2014 (11 pages).

The Registry of Patents Singapore, "Certificate of Grant of Patent," issued in connection with Singapore Application No. 2011078219, May 19, 2014 (52 pages).

United States Patent and Trademark Office, "Office Action," issued in connection with U.S. Appl. No. 13/244,734, May 7, 2014 (37 pages).

United States Patent and Trademark Office, "Notice of Allowance," issued in connection with U.S. Appl. No. 13/244,734, Sep. 11, 2014 (12 pages).

\* cited by examiner

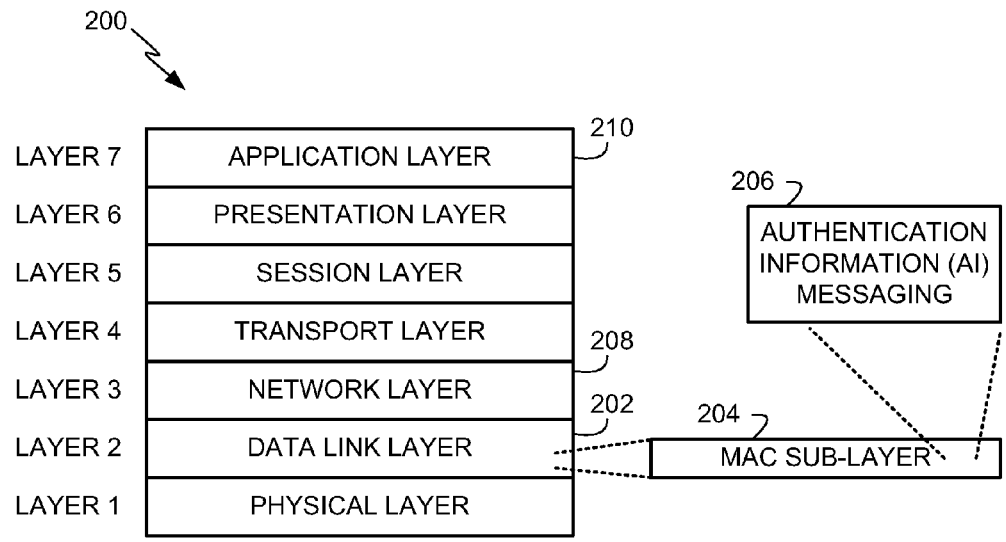

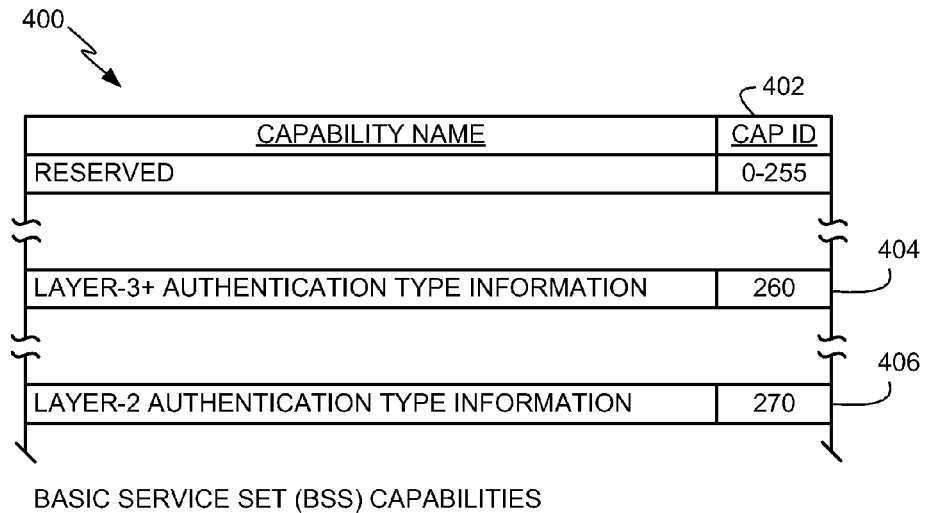

400

| CAPABILITY NAME | CAP ID |
|---|---|
| RESERVED | 0-255 |
| ⋮ | |
| LAYER-3+ AUTHENTICATION TYPE INFORMATION | 260 |
| ⋮ | |
| LAYER-2 AUTHENTICATION TYPE INFORMATION | 270 |

BASIC SERVICE SET (BSS) CAPABILITIES

FIG. 4

| AI TYPE | AI ID | FORMAT |
|---|---|---|
| EAP METHOD NAME | 1 | INTEGER |
| INNER AUTHENTICATION MODE | 2 | STRING |
| CERTIFICATE TYPE | 3 | STRING |
| SECURITY HARDWARE | 4 | ENUM TYPE (1-SIM, 2-USIM, 3-NFC SECURE ELEMENT, 4-HARDWARE TOKEN) |
| AUTHENTICATION PARAMETER (AuP) | 5 | STRING (LIST OF COMMA SEPARATED AuP INDICATORS) |
| VENDOR SPECIFIC | 255 | STRING |

LAYER-2 AUTHENTICATION INFORMATION (AI)

FIG. 5

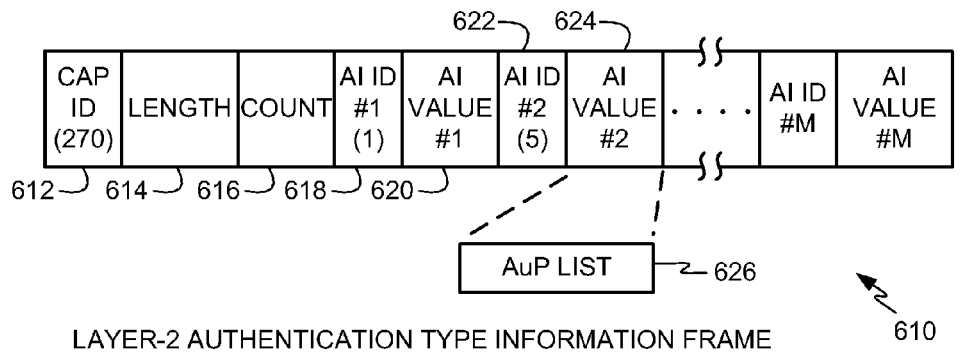
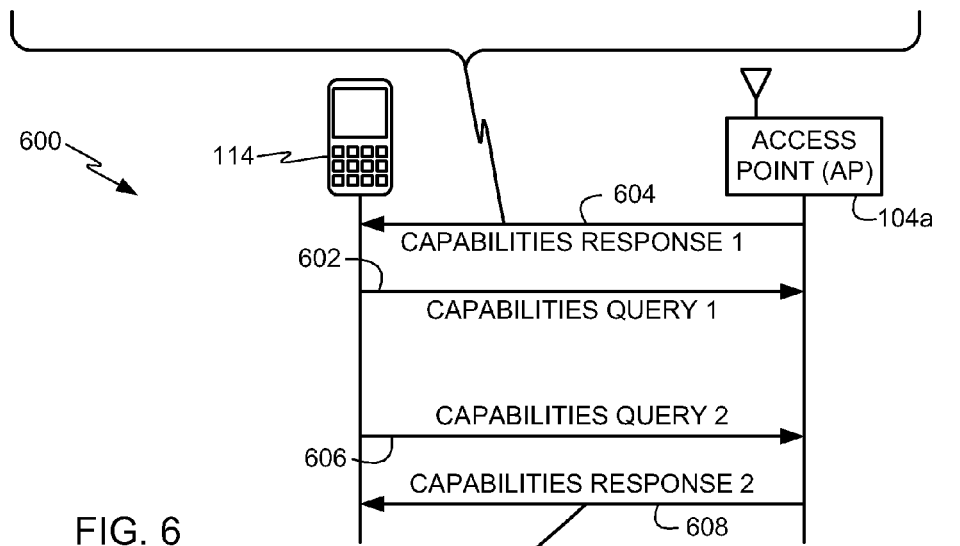
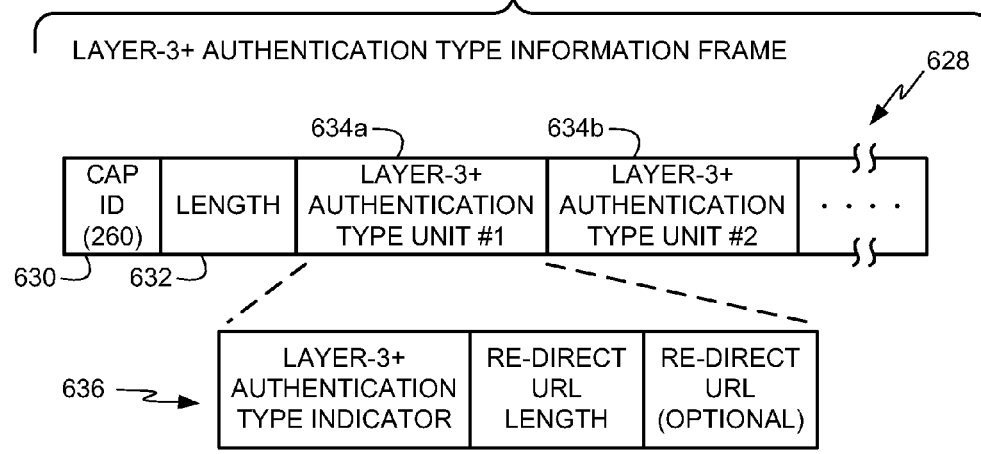
FIG. 6

ACCESS POINT

METHODS AND APPARATUS TO DISCOVER AUTHENTICATION INFORMATION IN A WIRELESS NETWORKING ENVIRONMENT

RELATED APPLICATIONS

This Patent claims the benefit of U.S. Provisional Patent Application No. 61/172,597, filed on Apr. 24, 2009, which is hereby incorporated herein by reference in its entirety.

FIELD OF THE DISCLOSURE

The present disclosure relates generally to network communications and, more particularly, to methods and apparatus to discover authentication information in a wireless networking environment.

BACKGROUND

Wireless network deployments, such as wireless local area networks (WLANs), allow wireless terminals to access network and Internet services when within proximity of wireless communication signals of those wireless networks. Commercially available WLANs, such as those located in retail environments or other publically accessible establishments, operate in unsecure modes to enable wireless terminals to establish communications with the WLANs and external networks (e.g., service provider networks, carrier networks, etc.) accessible via those WLANs. This unsecure mode of operation allows wireless terminals to negotiate connection and registration information with the external networks via high-level communications using Internet protocol (IP) addresses and a hypertext transfer protocol (HTTP) to enable registration of the wireless terminals with the external networks. However, such unsecure modes of operation using high-level communications leaves external networks vulnerable to malicious attacks or other undesirable activity aimed at circumventing network procedures created for orderly and deterministic wireless terminal registration.

BRIEF DESCRIPTION OF THE DRAWINGS

FIG. 2 depicts an example communication layer architecture.

FIG. 3 depicts an example authentication parameters (AuPs) data structure.

FIG. 4 depicts an example basic service set (BSS) capabilities data structure that may be used in connection with the example messaging exchange process of FIG. 6 to discover authentication information in a wireless network.

FIG. 5 depicts an example authentication information data structure that may be used in connection with the example messaging exchange process of FIG. 6 to discover authentication information in a wireless network.

FIG. 6 depicts an example messaging exchange process that may be used to discover authentication information in a wireless network.

DETAILED DESCRIPTION

Figure 1:
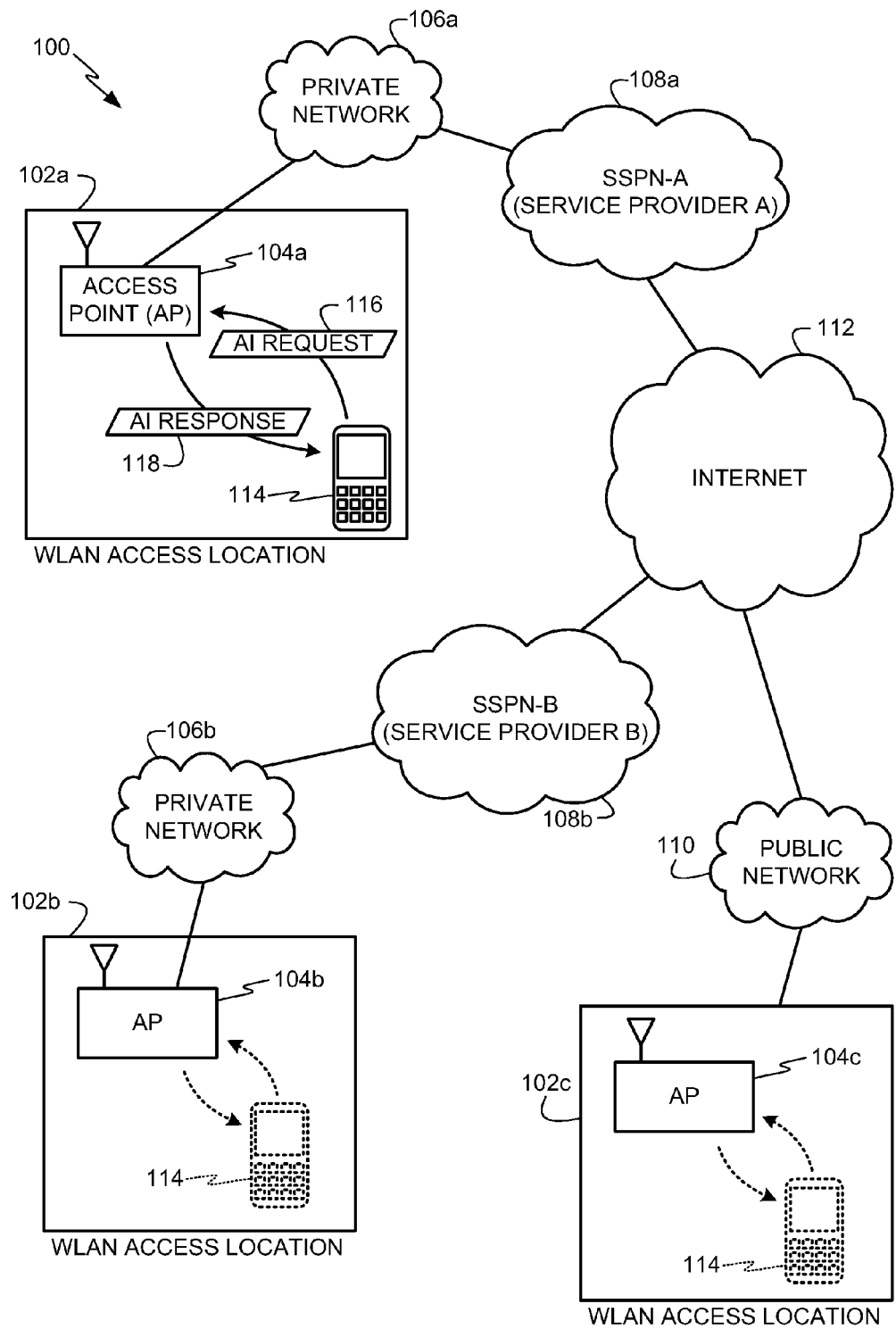
FIG. 1 depicts an example communication network in which a plurality of wireless local area network access locations are communicatively coupled to one or more networks.

Although the following discloses example methods and apparatus including, among other components, software executed on hardware, it should be noted that such methods and apparatus are merely illustrative and should not be considered as limiting. For example, it is contemplated that any or all of these hardware and software components could be embodied exclusively in hardware, exclusively in software, exclusively in firmware, or in any combination of hardware, software, and/or firmware. Accordingly, while the following describes example methods and apparatus, persons having ordinary skill in the art will readily appreciate that the examples provided are not the only way to implement such methods and apparatus.

The example methods and apparatus described herein can be used by a wireless terminal to discover authentication information (AI) and authentication parameters (AuP) required to authenticate the wireless terminal for connection to a wireless network. The example methods and apparatus described herein can be used in connection with mobile communication devices, mobile computing devices, or any other device capable of communicating wirelessly with a wireless network. Such devices, also referred to as terminals, wireless terminals, or user equipment (UE), may include mobile smart phones (e.g., a BLACKBERRY® smart phone), wireless personal digital assistants (PDA), laptop/notebook/netbook computers with wireless adapters, etc. The example methods and apparatus are described herein in connection with the wireless local area network (WLAN) communication standard known as IEEE® (Institute for Electrical and Electronics Engineers) 802.11, which, among other things, defines interworking with external networks. However, the example methods and apparatus may additionally or alternatively be implemented in connection with other wireless communication standards including other WLAN standards, personal area network (PAN) standards, wide area network (WAN) standards, or cellular communication standards.

Although the example methods and apparatus described herein can be implemented in any environment providing WLAN access for network connectivity, the example methods and apparatus can be advantageously implemented in WLAN access locations or environments in which it is expected that one or more users carrying respective wireless terminals will frequently connect and disconnect from a WLAN as they enter and exit the WLAN access locations or environments. WLAN locations or environments are sometimes known as "hotspots" in reference to a location or environment that is within communication reach of WLAN signals. Such example WLAN locations or environments include coffee shops, retail stores, educational facilities, office environments, airports, public transportation stations and vehicles, hotels, etc.

The user experience associated with known techniques or standards for connecting a wireless terminal to an access point (AP) of a WLAN hotspot can often prove frustrating. For example, it is often necessary to correctly discover the radio network identifier (e.g., an IEEE® 802.11 Service Set Identifier (SSID) parameter), and it may also be necessary to discover particular AI and AuPs (chosen by the hotspot owner/provider) required to connect to the WLAN-supported network (e.g., an external network) behind the AP of the hotspot.

In some instances, it may be sufficient for a wireless terminal to provide a Network Address Identifier (NAI) indicating the user's identity to the AP for authentication to proceed and to place the wireless terminal in communication with the external network behind the AP. In other instances, a wireless terminal may have to be provided with, for example, a subscriber identity module (SIM) card for authentication to proceed. Such situations often create frustrating user experiences when wireless terminals fail to connect to WLAN access locations due to missing or lacking authentication information. In other situations, even when users do know the particular authentication information that must be provided, the process of providing such authentication information from the wireless terminal to the AP can be burdensome (e.g., manual input).

Referring particularly to WLAN access locations (or WLAN hotspots) operating under the IEEE® 802.11 wireless communication standard, this standard is currently lacking in provisions to provide wireless terminals with the necessary authentication-related details about WLAN-supported networks (e.g., external networks) to which WLAN APs are connected. Thus, a user desiring access to the network is typically required to manually configure some aspects of an IEEE® 802.11 compliant wireless terminal, unless the AP is operating in an open unsecure manner, in which case, no AuPs are needed to access the network. As WLAN technology is further deployed throughout different locations, open unsecure access will appeal to fewer and fewer WLAN hotspot providers. The example methods and apparatus described herein can be used to enable wireless terminals to discover or obtain AI and AuP requirements associated with WLAN hotspots, thus, substantially reducing or eliminating the reliance on user involvement when accessing wireless services, and thereby, improving user experiences with such services. Example scenarios in which the example methods and apparatus can be advantageously used are described below in connection with FIG. 1.

Although the example methods and apparatus are described herein in connection with enabling wireless terminals to discover AI and AuP requirements of APs, the example methods and apparatus may also be used to enable APs to discover AI and AuP requirements of wireless terminals. For example, when a wireless terminal is already connected to an external network (e.g., a wireless service provider's network via a cellular data link, a PAN via a BLUETOOTH® link, etc.), an AP may be configured to discover AI and AuP requirements associated with that external network by querying the wireless terminal using the example techniques described herein. The example methods and apparatus described herein may also be used in connection with mesh networking environments to enable a first AP to discover AI and AuP requirements associated with a second AP by querying a wireless terminal that is directly connected to the second AP or indirectly connected to the second AP via one or more other wireless terminals. In this manner, the first AP can connect to an external network associated with the second AP if the first AP has the required AI and/or AuP values.

Turning now to FIG. 1, an example communication network 100 in which the example methods and apparatus described herein may be implemented is shown. As shown in FIG. 1, the example communication network 100 includes a plurality of WLAN access locations 102a-c that provide access to one or more networks (e.g., WLAN-supported networks or external networks) via respective access points 104a-c. In the illustrated example, the access point (AP) 104a provides access to a private network 106a, which in turn provides access to a subscription service provider network A (SSPN-A) 108a. Also in the illustrated example, AP 104b provides access to a private network 106b, which in turn provides access to a subscription service provider network B (SSPN-B) 108b. The SSPNs 108a-b may be owned and/or operated by data subscription service providers, Internet subscription service providers, media (e.g., audio/video) subscription service providers, wireless communications subscription service providers, or any combination thereof.

The AP 104c provides access to a public network 110, which is shown as providing access to the Internet 112. Although not shown, each of the APs 104a-c is provided with an AP station (i.e., an AP STA), which is the interface or component, such as a network adapter or network interface card (NIC), that connects to a wireless medium.

Each of the WLAN access locations 102a-c may be associated with different sets of AuPs required of a wireless terminal 114 to gain access to the networks 106a, 106b, and/or 110 through the APs 104a-c. These AuPs can be selected by respective owners or operators of the networks 106a, 106b and 110. The AuPs may be selected based on different factors such as, for example, desired security levels and/or business objectives. For instance, if the WLAN access location 102a is an airport, the private network 106a may require relatively more authentication parameters from a wireless terminal than would a retail establishment to minimize or prevent vulnerabilities in airport/airline computer networks. Additionally or alternatively, the private networks 106a-b may have different contract agreement terms with respective ones of the service providers of the SSPNs 108a-b, thus leading to different sets of AuP requirements. Such differing AuPs may be related to different network access charging/pricing structures or different wireless device roaming agreements. Some networks, such as the public network 110, may require fewer or no AuPs.

In any case, the example methods and apparatus described herein can be advantageously used to enable the wireless terminal 114 to move between different WLAN access locations (e.g., the WLAN access locations 102a-c) without requiring the wireless terminal 114 to be preconfigured or pre-loaded with different sets or lists of AuP requirements associated with accessing those different WLAN access locations. In this manner, the wireless terminal 114 can dynamically receive or learn required AuPs from any AP that it has not encountered before or that has had its required AuPs changed since a previous access session between the wireless terminal 114 and the AP. In the illustrated examples described herein, the wireless terminal 114 includes a non-AP station (i.e., a non-AP STA), while each of the APs 104a-c includes a respective AP STA.

As shown generally in connection with the WLAN access location 102a, the wireless terminal 114 can retrieve required AI (including AuPs) from the AP 104a by transmitting an AI request message 116 and receiving an AI response message 118 including identifiers indicating one or more required AI and/or AuPs. In the illustrated example, the AI request message 116 and the AI response message 118 can be exchanged prior to an authentication process using a pre-defined query protocol such as a Generic Advertisement Service (GAS) query/response format. The GAS query format, as defined in IEEE® 802.11, enables non-AP STAs (e.g., the wireless terminal 114) to discover the availability of information (e.g., AP capabilities, AI, AuPs, etc.) related to desired network services. Alternatively, the AI request message 116 and the AI response message 118 can be exchanged during an authentication process in accordance with, for example, provisions in the IEEE® 802.11 standard involving secure handshake communications that securely exchange information to ensure confidentiality of such information.

Turning to FIG. 2, an example communication layer architecture 200 is shown as having seven layers which may be implemented in accordance with the well-known Open Systems Interconnection (OSI) Reference Model. In the illustrated example, the communication layer architecture 200 includes a data link layer 202, which includes a media access control (MAC) sub-layer 204. To enable wireless terminals (e.g., the wireless terminal 114 of FIG. 1) to retrieve AI and AuPs from wireless APs (e.g., the wireless APs 102a-c of FIG. 1), the example methods and apparatus described herein can be used to perform operations or processes including AI messaging 206 (e.g., the AI request message 116 and the AI response message 118 of FIG. 1) at the MAC sub-layer 204. That is a wireless terminal can retrieve required AI values and/or AuP values from a memory or other hardware of the wireless terminal using one or more authentication value retrieval processes performed by the wireless terminal at the MAC sub-layer 204 without needing to allow the authentication value retrieval process(es) to perform operations at or above an internet protocol (IP) layer (e.g., a network layer 208) nor needing to otherwise provide the authentication value retrieval process(es) with access to the IP layer.

Some authentication techniques that use hyper text transfer protocol (HTTP) or other internet protocol (IP) processes to display login websites and/or terms and conditions websites require establishing a connection between a wireless terminal and a wireless AP at one or more of the layers between and including a network layer 208 (e.g., an internet protocol (IP) layer) and an application layer 210 of the communication layer architecture 200. However, such techniques can often create certain vulnerabilities to WLAN-supported networks (e.g., one of the private networks 106a-b) that can be exploited in harmful ways by malicious or mischievous users. That is, users can access network resources using authentication-bypass techniques based on IP or HTTP communications or other communication protocols at or above the network layer 208. The AI messaging 206 used in connection with the example methods and apparatus described herein can substantially reduce or eliminate such vulnerabilities by using an authentication process involving operations at a MAC sub-layer network connection making it relatively more difficult or impossible for users to access such low-level network resources to bypass authentication processes.

In addition, authentication techniques implemented at or above the network layer 208 require relatively more processing power of a wireless terminal than implementing processes at the MAC sub-layer 204. Mobile wireless terminals (e.g., the wireless terminal 114 of FIG. 1) such as mobile smart phones, PDA's, etc. often have relatively limited processor cycles and available electrical power than fixed-location computing devices powered using alternative current (AC) electricity sources. Thus, the example methods and apparatus described herein can be advantageously used to configure, design, or otherwise engineer mobile wireless terminals to operate more efficiently (i.e., do more with fewer processor cycles) while minimizing battery power use. That is, the example methods and apparatus described herein can be advantageously used to promote mobile wireless terminal designs that consume relatively less power consumption and operate relatively more efficiently. For example, low-level resource operations at the MAC sub-layer 204 require relatively less system resources than user-interface-intensive and operating system (OS)-intensive operations (e.g., webbrowser operations) at the application layer 210.

Another example advantage of the AI messaging 206 at the MAC sub-layer 204 is that a wireless terminal can, without user involvement or with minimal user involvement, determine whether connecting to a particular AP is even an option based on the required AI and/or AuPs advertised by that AP and which may be requested by the network behind the AP. For example, if the AP 104a indicates that it requires a SIM card identifier, and the wireless terminal 114 does not have a SIM card storing a particular code, a user of the wireless terminal 114 is not given the option to discover that the AP is available for connection. Thus, during a WLAN discovery process initiated by the user of the wireless terminal 114, the wireless terminal 114 does not return the SSID of the AP 104a because it would not be possible for the wireless terminal 114 to connect to the AP 104a without a SIM card. Such an implementation would substantially reduce or eliminate user frustration because the user would not engage in any attempts to connect when such a connection is impossible based on the user's credentials. In such an example, the SIM card requirement may be imposed by a wireless service provider that owns or operates the SSPN-A 108a to, for example, ensure that only wireless terminals (e.g., smart phones) associated with its service can gain network access. That is, when the wireless terminal 114 determines that it does have the SIM card requirement, it displays the SSID of the AP 104a because it is capable of being authenticated by the AP 104a. Although an SSID is used in connection with the above example and in other examples described below, an AP may alternatively be configured to broadcast a Homogeneous Extended Service Set Identifier (HESSID). An HESSID includes an SSID associated with a particular AP and a network identification corresponding to a supported SSPN. For instance, if the AP 104a of FIG. 1 were configured to broadcast an HESSID, it would include the SSID of the AP 104a and the network identification corresponding to the SSPN-A 108a.

FIG. 3 depicts an example authentication parameters (AuPs) data structure 300 shown in table format to facilitate its description. The example AuPs data structure 300 includes a plurality of AuP names 302, each of which is associated with a respective one of a plurality of AuP identifiers 304. In the illustrated example, the AuP identifiers 304 are not themselves AuP values, but instead are identifiers used by wireless APs (e.g., the wireless APs 104a-c of FIG. 1) to indicate to wireless terminals (e.g., the wireless terminal 114 of FIG. 1) which AuP values the wireless terminals must have to be authenticated and establish network communications via the wireless APs. For example, according to the AuPs data structure 300, a NAI AuP ID (i.e., AuP ID=1) is used to indicate to the wireless terminal 114 that the wireless terminal 114 must provide an AuP value equal to a user's identity associated with the wireless terminal 114.

The AuP identifiers 304 identify AuPs that typically involve authentication at the MAC sub-layer 204. However, in some example implementations, some AuPs may involve requesting a user password entry or PIN entry. In the illustrated example, the AuPs data structure 300 includes a network address indicator (NAI) parameter (e.g., a wireless terminal user's identity), a server subject parameter, a server storage area network (SAN) parameter, and entries reserved for vendor-specific parameters. In other example implementations, the AuPs data structure 300 may be provided with fewer, more, and/or different AuPs.

Owners or operators of WLAN-supported networks can select one or more of the AuPs in the AuPs data structure 300 as required AuPs to allow authentication and connection to their WLAN-supported networks. In some example implementations, the wireless terminal 114 may be configured to store a complete list of the AuPs in the AuPs data structure 300, while in other example implementations, the wireless terminal 114 can be configured to store select ones of the AuPs. For example, if the wireless terminal 114 is provided by a wireless mobile phone service provider that elects to allow its devices to wirelessly connect only to sponsored or approved WLAN hotspots using SIM card identification values, the wireless terminal 114 may store only a NAI AuP identifier (AuP ID=1) associated with the AuPs data structure 300 in addition to a security hardware identifier discussed below in connection with FIG. 5. In such an example implementation, the NAI AuP identifier refers to requiring a user identification value, and the security hardware identifier refers to requiring a SIM card identification value (or other identification value corresponding to another security hardware element (e.g., a universal SIM (USIM) card or a near field communication (NFC) secure element)).

The wireless terminal 114 can be configured to discover one or more of the AuPs in the AuPs data structure 300 using the example AI discovery technique described below in connection with FIGS. 4-6, or using the example AI discovery technique described below in connection with FIGS. 7-9.

As discussed below in connection with FIGS. 4-6, an AP may be configured to advertise its authentication requirements as two separate types of authentication capabilities, the first one of which involves a wireless terminal performing operations or processes at or above the network layer 208 (FIG. 2) and the second one of which involves the wireless terminal performing operations at the MAC sub-layer 204 (or the data link layer 202) (FIG. 2). Operations at or above the network layer 208 (e.g., IP operations at the network layer 208, HTTP operations at the application layer 210, etc.) can include obtaining a confirmation that a user accepted particular terms and conditions and/or obtaining login username and/or password credentials using a login page displayed with a uniform resource locator (URL) redirect operation.

In alternative example implementations, as discussed below in connection with FIGS. 7-9, an AP can be configured to advertise a single authentication capability that can indicate authentication requirements involving operations at the MAC sub-layer 204 (or the data link layer 202) and authentication requirements involving operations at or above the network layer 208.

Now turning to FIGS. 4-6, FIG. 4 depicts an example basic service set (BSS) capabilities data structure 400, FIG. 5 depicts an example layer-2 authentication information (AI) data structure 500, and FIG. 6 depicts an example messaging process (e.g., which may be used to implement the AI messaging 206 of FIG. 2) to discover AI in a WLAN environment (e.g., one of the WLAN access locations 102a-c of FIG. 1). The example messaging process of FIG. 6 can be used in connection with the information in the BSS capabilities data structure 400 and the layer-2 AI data structure 500 to implement an example AI discovery technique involving using a first AI query to discover AI requirements associated with operations at the MAC sub-layer 204 (FIG. 2) and a second AI query to discover AI requirements associated with operations at or above the network layer 208 (FIG. 2).

The example BSS capabilities data structure 400 stores CAP IDs 402 (i.e., capability identifiers) of APs and/or wireless terminals. In the illustrated example, the BSS capabilities data structure 400 includes a layer-3+ authentication type information capability entry 404 and a layer-2 authentication type information capability entry 406, each associated with a respective one of the CAP IDs 402. The layer-3+ authentication type information capability entry 404 and the layer-2 authentication type information capability entry 406 are used to indicate capabilities of the APs 104a-c of FIG. 1. Thus, in the illustrated example, the BSS capabilities data structure 400 can be stored in the APs 104a-c and are discoverable using pre-defined query protocol formats by wireless terminals (e.g., the wireless terminal 114) attempting to connect to respective WLAN supported networks (e.g., the networks 106a-b and 110 of FIG. 1). An example pre-defined query protocol format includes the GAS query format described above.

In the illustrated example, the layer-3+ authentication type information capability entry 404 can be used to indicate that the associated AP requires an HTTP-level authentication. Such an authentication can be implemented using URL redirect techniques that involve redirecting a wireless terminal's web browser to a particular URL requiring a wireless terminal user to perform additional steps required for access (e.g., accept terms and conditions, on-line login enrollment, etc.). The layer-2 authentication type information capability entry 406 can be used to indicate that the associated AP requires one or more of the AuPs shown in the AuPs data structure 300 of FIG. 3 and/or AI described below in connection with FIG. 5.

The example layer-2 AI data structure 500 of FIG. 5 stores authentication information that is retrieved by the wireless terminal 114 from an AP (e.g., one of the APs 104a-c of FIG. 1). In the illustrated example, the layer-2 AI data structure 500 can be used to indicate protocols or information that an AP requires to exchange information and perform authentication processes. The AI types or protocols are shown as AI types 502, and each AI type is identified by a corresponding AI ID 504.

In the illustrated example, the layer-2 AI data structure 500 stores an Extensible Authentication Protocol (EAP) method AI type 506, which can be used to indicate that an AP (e.g., one of the APs 104a-c of FIG. 1) supports and/or requires one or more EAP authentication protocols. EAP is a type of protocol that can be used to perform authentication processes in wireless networks and is sometimes used in connection with the well-known Wi-Fi Protected Access (WPA) standards. In operation, EAP communications can be invoked by any of the APs 104a-c of FIG. 1 in accordance with the well-known IEEE® 802.1X standard, which is part of the IEEE® 802.11 architecture. Known EAP methods include EAP-MD5, EAP-OTP, EAP-GTC, EAP-TLS, EAP-IKEv2, EAP-SIM, EAP-AKA, and PEAP. Each EAP method can be identified using a corresponding integer-format value assigned by an industry-standard resource coordination body such as the Internet Assigned Numbers Authority (IANA) (http://www.iana.org). Other EAP methods can also include vendor-specific methods.

The example layer-2 AI data structure 500 also stores an inner authentication mode AI type 508, a certificate type AI type 510, a security hardware AI type 512, an AuP AI type 514, and vendor-specific AI types 516. The inner authentication mode AI type 508 can be used to indicate that an AP (e.g., one of the APs 104a-c of FIG. 1) supports and/or requires secure tunneling protocols to securely exchange information between the AP and a wireless terminal. The certificate type AI type 510 can be used to indicate that an AP (e.g., one of the APs 104*a-c* of FIG. 1) supports and/or requires security certificates to securely exchange information. The security hardware AI type 512 can be used to indicate that an AP supports and/or requires a wireless terminal to have one or more credentials provided by or supplied by a hardware element associated with the wireless terminal. The enumerated hardware elements in the illustrated example of FIG. 5 include a SIM card, a USIM card, a NFC secure element, and a hardware token.

The AuP AI type 514 can be used to indicate which of the AuPs in the AuPs data structure 300 of FIG. 3 are required by an AP (e.g., one of the APs 104*a-c* of FIG. 1) to allow a wireless terminal to be authenticated for establishing a network connection with the AP. The vendor-specific AI type 516 can be used to define additional or alternative AI types defined by owners or operators of WLAN supported networks (e.g., the networks 106*a-b*, 108*a-b*, and 110 of FIG. 1). Example messaging frame formats that can be used by a wireless terminal to retrieve the AI of the layer-2 AI data structure 500 are described below in connection with FIG. 6.

Referring now to FIG. 6, the illustrated example shows a messaging exchange process 600 that may be used to discover AI requirements in a wireless network in connection with the data structures described above in connection with FIGS. 3-5. As shown, the messaging exchange process 600 involves a plurality of query/response exchanges between the wireless terminal 114 and the AP 104*a* to discover AI supported and/or required by the AP 104*a* to allow the wireless terminal 114 to establish a network connection to the WLAN-supported private network 106*a* and/or the SSPN-A 108*a* of FIG. 1. In the illustrated example, the capabilities of the AP 104*a* include support for layer-3+ authentication type information described above in connection with the layer-3+ authentication type information capability entry 404 of FIG. 4 and layer-2 authentication type information described above in connection with the layer-2 authentication type information capability entry 406 of FIG. 4.

As shown in FIG. 6, the wireless terminal 114 and the AP 104*a* perform a first set of message exchanges involving a first capabilities query 602 and a first capabilities response 604, which allow the wireless terminal 114 to discover which ones of the AI and AuPs from the layer-2 AI data structure 500 and the AuPs data structure 300 are required by the AP 104*a* to authenticate the wireless terminal 114. In the illustrated example, the wireless terminal 114 and the AP 104*a* also perform a second set of message exchanges involving a second capabilities query 606 and a second capabilities response 608, which allow the wireless terminal 114 to discover the layer-3+ authentication type information (e.g., IP-level authentication information, HTTP-level authentication information, etc.) that is supported and/or required by the AP 104*a*. The queries 602 and 606 can be performed by the wireless terminal 114 using the GAS query format described above. Although the queries/responses 602/604 and 606/608 are described as first and second query/responses, such description does not imply any required ordering of the sets of message exchanges. That is, the query/response 606/608 exchange could alternatively be performed prior to the query/response 602/604 exchange. In addition, either of the query/response 602/604 and 606/608 exchanges could occur without the other.

To allow the wireless terminal 114 to discover layer-2 authentication type information, the AP 104*a* responds to the capabilities query 602 by communicating a layer-2 authentication type information frame 610 to the wireless terminal 114 via the capabilities response 604. In the illustrated example, the layer-2 authentication type information frame 610 includes a CAP ID field 612, a length field 614, a count field 616, and a plurality of authentication information identifier (AI ID) fields and corresponding AI value fields.

The CAP ID field 612 identifies the BSS capability with which the frame 610 is associated. Thus, to indicate that the frame 610 is a layer-2 authentication type information frame, the CAP ID field 612 of the illustrated example stores the capabilities identifier (e.g., CAP ID=270) corresponding to the layer-2 authentication type information 406 of the BSS capabilities data structure 400 of FIG. 4.

The length field 614 stores the byte length of the layer-2 authentication type information frame 610 to enable retrieval of the same from memory after the frame 610 is received by the wireless terminal 114. The count field 616 stores the quantity of AI IDs to follow in the layer-2 authentication type information frame 610.

In the illustrated example, each of the AI ID fields (AI ID #1 through AI ID # M) in the layer-2 authentication type information frame 610 stores a unique one of the AI IDs 504 of the layer-2 AI data structure 500 to denote one or more of the AI types 502 that are supported and/or required by the AP 104*a*. A first one of the AI ID fields (i.e., AI ID #1) is denoted by reference numeral 618 and its corresponding AI value field (i.e., AI value #1) is denoted by reference numeral 620. A second one of the AI ID fields (i.e., AI ID #2) is denoted by reference numeral 622 and its corresponding AI value field (i.e., AI value #2) is denoted by reference numeral 624. In some example implementations, the AI ID #1 field 618 can store an AI ID identifier equal to 1, which corresponds to the EAP method AI type 506 as shown in the layer-2 AI data structure 500 of FIG. 5. In such examples, the AI value #1 field 620 can store the integer-format value of a particular EAP authentication protocol (e.g., EAP-MD5, EAP-OTP, EAP-GTC, EAP-TLS, EAP-IKEv2, EAP-SIM, EAP-AKA, PEAP, etc.).

In the illustrated example, the AI ID #2 field 622 stores an AI ID identifier equal to 5, which corresponds to the AuP AI type 514 as shown in the layer-2 AI data structure 500. In addition, the AI value #2 field 624 stores an AuP list 626, which includes one or more comma-separated AuPs from the AuPs data structure 300 of FIG. 3 (e.g., NAI [AuP ID=1], server SAN [AuP ID=3], etc.).

Referring now to the query/response 606/608 exchange, to allow the wireless terminal 114 to discover layer-3+ type information, the AP 104*a* responds to the capabilities query 606 by communicating a layer-3+ authentication type information frame 628 to the wireless terminal 114 via the capabilities response 608. In the illustrated example, the layer-3+ authentication type information frame 628 includes a CAP ID field 630, a length field 632, and a plurality of layer-3+ authentication type unit fields 634*a* and 634*b*.

The CAP ID field 630 identifies the BSS capability with which the frame 628 is associated. Thus, to indicate that the frame 628 is a layer-3+ authentication type information frame, the CAP ID field 630 of the illustrated example stores the capabilities identifier (e.g., CAP ID=260) corresponding to the layer-3+ authentication type information capability entry 404 of the BSS capabilities data structure 400 of FIG. 4. The length field 632 stores the byte length of the layer-3+ authentication type information frame 628 to enable retrieval of the same from memory after the frame 628 is received by the wireless terminal 114.

Each of the layer-3+ authentication type unit fields 634*a-b* stores a re-direct URL frame 636, only one of which is shown. The re-direct URL frame 636 can be used to implement other authentication procedures when additional steps are required for access (e.g., accept terms and conditions, on-line login enrollment, etc.) for establishing a connection with the AP 104a. In the illustrated example, the re-direct URL frame 636 enables authentication or additional procedures associated with processes implemented at the application layer 210 of the communication layer architecture 200 of FIG. 2. Such procedures may be in addition to or instead of authentication processes associated with the layer-2 authentication type information frame 610 discussed above. In some example implementations, the re-direct URL frame 636 may specify that a web browser of the wireless terminal 114 must display terms and conditions that must be accepted by a user or an on-line login enrollment page in which a user must login. The re-direct URL frame 636 may additionally or alternatively specify a HTTP/HTTPS redirection and/or a domain name server (DNS) redirection.

Figures 7, 8:
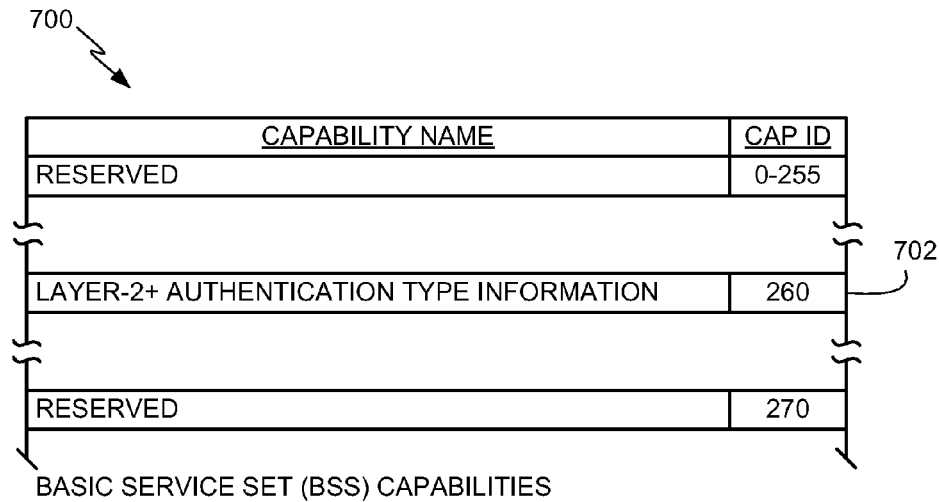
FIG. 7 depicts another example basic service set (BSS) capabilities data structure that may be used in connection with the example messaging exchange process of FIG. 9 to discover authentication information in a wireless network.
FIG. 8 depicts another example authentication information data structure that may be used in connection with the example messaging exchange process of FIG. 9 to discover authentication information in a wireless network.
Figure 9:
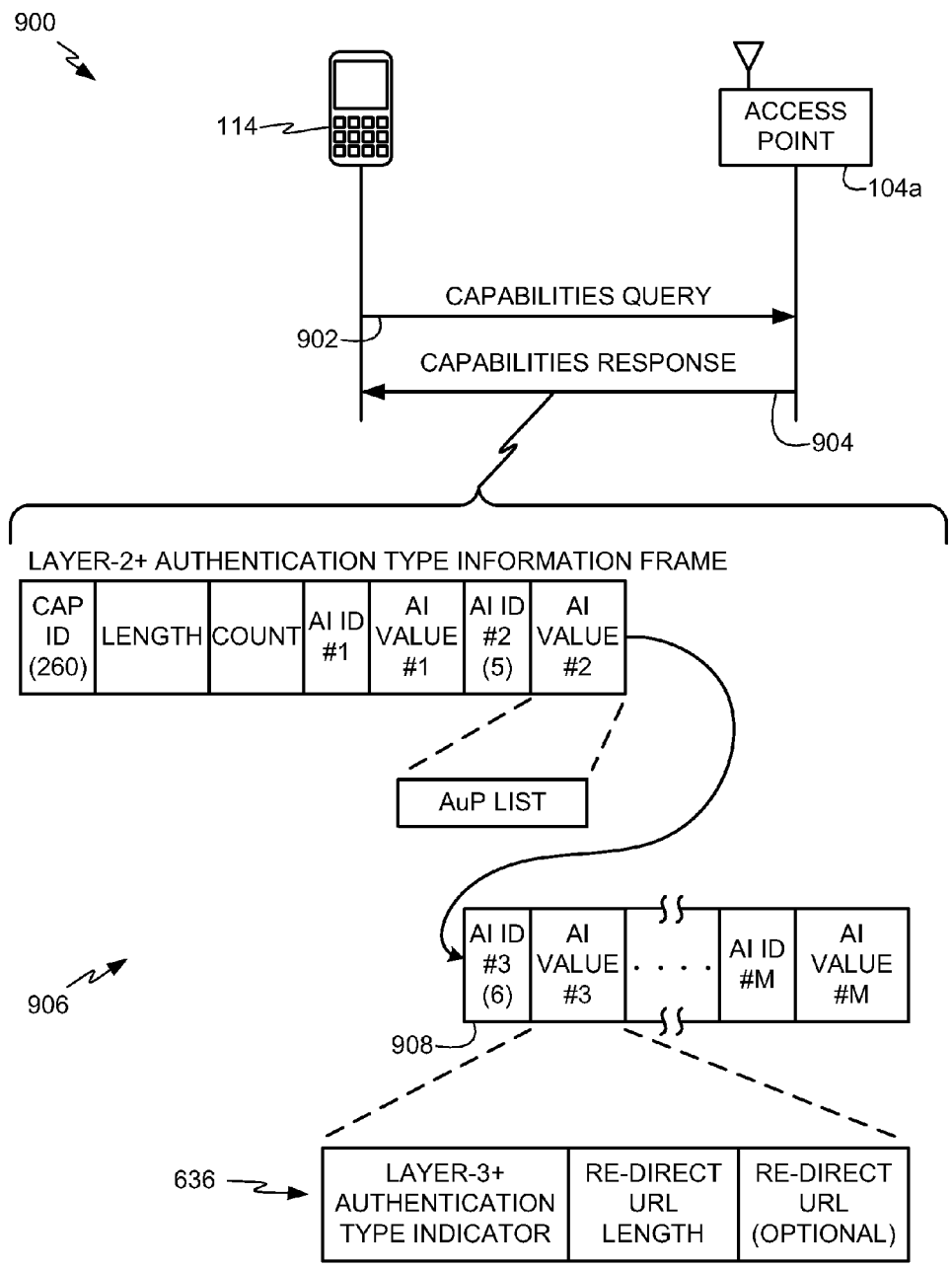
FIG. 9 depicts another example messaging exchange process that may be used to discover authentication information in a wireless network.

Turning to FIGS. 7-9, FIG. 7 depicts another example basic service set (BSS) capabilities data structure 700, FIG. 8 depicts an example layer-2+ authentication information (AI) data structure 800, and FIG. 9 depicts another example messaging process (e.g., which may be used to implement the AI messaging 206 of FIG. 2) to discover AI in a WLAN environment (e.g., one of the WLAN access locations 102a-c of FIG. 1). As discussed below, the BSS capabilities data structure 700 is a modified version of the BSS capabilities data structure 400 of FIG. 4, and the layer-2+ AI data structure 800 is a modified version of the layer-2 AI data structure 500 of FIG. 5.

Unlike the BSS capabilities data structure 400 of FIG. 4 which stores the layer-3+ authentication type information capability entry 404 separate from the layer-2 authentication type information capability entry 406, the BSS capabilities data structure 700 of FIG. 7 stores a layer-2+ authentication type information capability entry 702. In the illustrated example, the layer-2+ authentication type information capability entry 702 indicates that an AP (e.g., the APs 104a-c of FIG. 1) supports all of the authentication processes and data (involving operations at or above the MAC sub-layer 204 of FIG. 2) that are otherwise indicated separately by the layer-3+ authentication type information capability entry 404 and the layer-2 authentication type information capability entry 406 of FIG. 4. That is, the layer-2+ authentication type information capability entry 702 indicates that all of the AI types of the layer-2 AI data structure 500 of FIG. 5 are combined with the URL re-direct capability described above in connection with the redirect URL frame 636 of FIG. 6. In this manner, when a wireless terminal queries an AP for supported and/or required capabilities associated with authentication, the wireless terminal can perform a single GAS query to discover all of the authentication information and/or parameters discussed above in connection with FIGS. 3-6 instead of two separate queries as described in connection with FIG. 6.

To enable a single-query authentication discovery, the layer-2+ AI data structure 800 of FIG. 8 is a modified version of the layer-2 AI data structure 500 of FIG. 5. That is, in addition to the AI types 506, 508, 510, 512, 514, and 516 shown in connection with the layer-2 AI data structure 500, the layer-2+ AI data structure 800 also includes a re-direct URL AI type 802, which corresponds to the authentication capabilities that are otherwise indicated by the layer-3+ authentication type information capability entry 404 of FIG. 4 and the re-direct URL frame 636 of FIG. 6.

Turning now to FIG. 9, the illustrated example shows a single-query messaging exchange process 900 that may be used to discover AI requirements in a wireless network in connection with the data structures described above in connection with FIGS. 3, 7, and 8. As shown, the single-query messaging exchange process 900 involves a single capabilities query 902 communicated by the wireless terminal 114 followed by a single capabilities response 904 communicated by the AP 104a. In the illustrated example, the capabilities of the AP 104a include support for the layer-2+ authentication type information described above in connection with the layer-2+ authentication type information capability entry 702 of FIG. 7.

As shown in FIG. 9, a layer-2+ authentication type information frame 906 communicated via the capabilities response 904 is capable of carrying the same information as described above in connection with the layer-2 authentication type information frame 610 of FIG. 6. In addition, the layer-2+ authentication type information frame 906 is also capable of carrying the re-direct URL frame 636 described above in connection with the layer-3+ authentication type information frame 628 of FIG. 6. In the illustrated example, an AI ID #3 field 908 stores an AI ID value of 6, which is shown as corresponding to the re-direct URL AI type 802 in FIG. 8.

Figure 10:
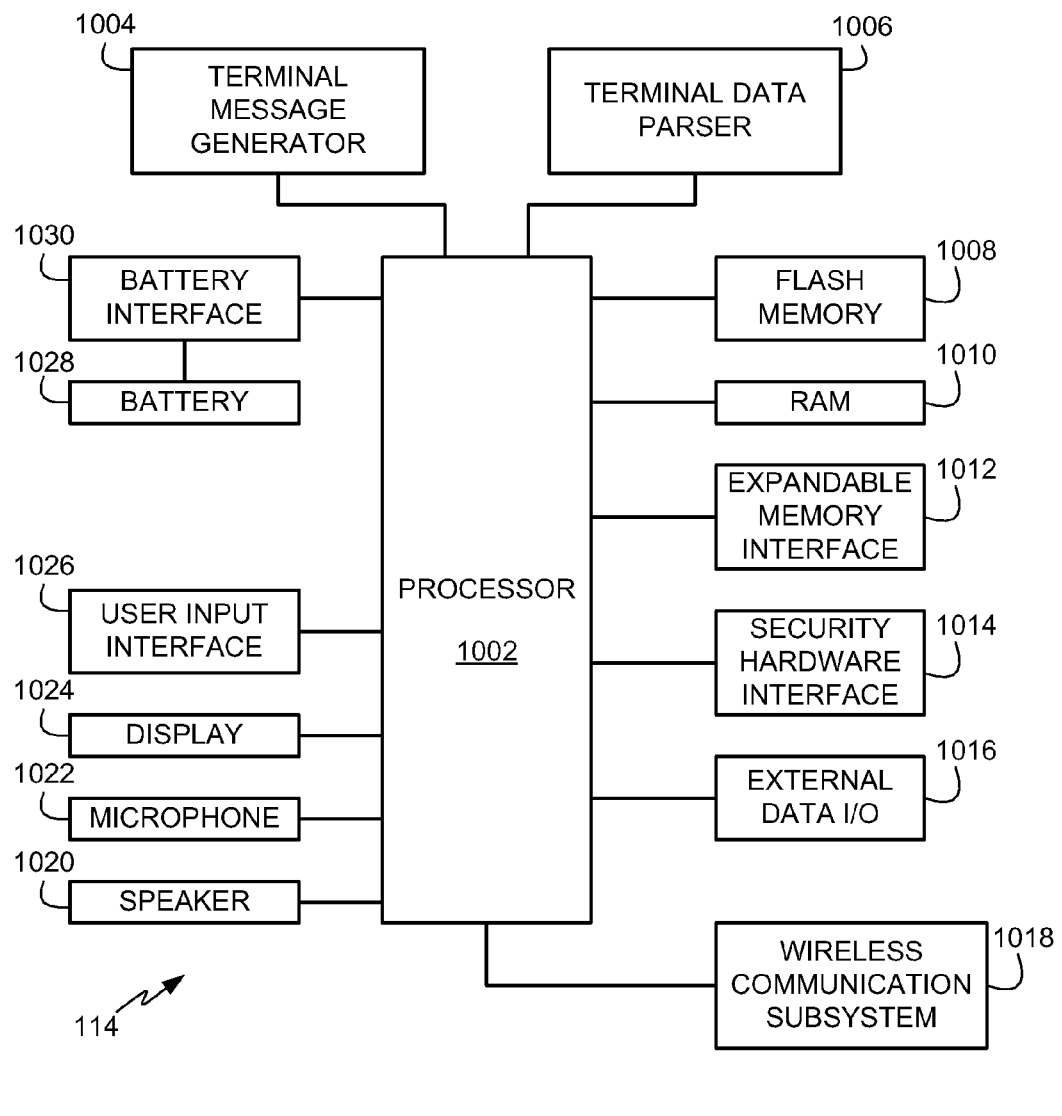
FIG. 10 depicts an example wireless terminal that may be used to implement the example methods and apparatus described herein.

Referring now to FIG. 10, an illustrated example of the wireless terminal 114 of FIGS. 1, 6 and 9 is shown in block diagram form. In the illustrated example, the wireless terminal 114 includes a processor 1002 that may be used to control the overall operation of the wireless terminal 114. The processor 1002 may be implemented using a controller, a general purpose processor, a digital signal processor, or any combination thereof.

The wireless terminal 114 also includes a terminal message generator 1004 and a terminal data parser 1006. The terminal message generator 1004 may be used to generate queries (e.g., the queries 602 and 606 of FIG. 6 and the query 902 of FIG. 9) in accordance with any query protocol including the GAS query protocol format discussed above. The terminal data parser 1006 may be used to retrieve frames of information from memory (e.g., a RAM 1010) and retrieve particular information of interest from those frames. For example, the terminal data parser 1006 may be used to retrieve AI and/or AuPs from any of the data frame formats discussed above in connection with FIGS. 6 and 9. Although the terminal message generator 1004 and the terminal data parser 1006 are shown as separate from and connected to the processor 1002, in some example implementations, the terminal message generator 1004 and the terminal data parser 1006 may be implemented in the processor 1002 and/or in a wireless communication subsystem (e.g., a wireless communication subsystem 1018). The terminal message generator 1004 and the terminal data parser 1006 may be implemented using any desired combination of hardware, firmware, and/or software. For example, one or more integrated circuits, discrete semiconductor components, and/or passive electronic components may be used. Thus, for example, the terminal message generator 1004 and the terminal data parser 1006, or parts thereof, could be implemented using one or more circuit(s), programmable processor(s), application specific integrated circuit(s) (ASIC(s)), programmable logic device(s) (PLD(s)), field programmable logic device(s) (FPLD(s)), etc. The terminal message generator 1004 and the terminal data parser 1006, or parts thereof, may be implemented using instructions, code, and/or other software and/or firmware, etc. stored on a machine accessible medium and executable by, for example, a processor (e.g., the example processor 1002). When any of the appended claims are read to cover a purely software implementation, at least one of the terminal message generator 1004 and the terminal data parser 1006 is hereby expressly defined to include a tangible medium such as a solid state memory, a magnetic memory, a DVD, a CD, etc.

The wireless terminal 114 also includes a FLASH memory 1008, a random access memory (RAM) 1010, and an expandable memory interface 1012 communicatively coupled to the processor 1002. The FLASH memory 1008 can be used to, for example, store computer readable instructions and/or data. In some example implementations, the FLASH memory 1008 can be used to store one or more of the data structures discussed above in connection with FIGS. 3, 4, 5, 7, and 8 and can also store AuP values associated with the wireless terminal 114. The RAM 1010 can also be used to, for example, store data and/or instructions.

The wireless terminal 114 is provided with a security hardware interface 1014 to receive a SIM card (or a USIM card or a NFC secure element) from a wireless service provider. As discussed above, a SIM card may be used as an authentication parameter to authenticate the wireless terminal 114 for establishing a connection with a WLAN-supported network. The wireless terminal 114 is also provided with an external data I/O interface 1016. The external data I/O interface 1016 may be used by a user to transfer information to the wireless terminal 114 through a wired medium. A wired data transfer path may, for example, be used to load an encryption key or other type of AuP onto the wireless terminal 114 through a direct and, thus, reliable and trusted connection to provide secure device communication.

The wireless terminal 114 is provided with a wireless communication subsystem 1018 to enable wireless communications with WLAN APs (e.g., the APs 104a-c of FIG. 1). Although not shown, the wireless terminal 114 may also have a long-range communication subsystem to receive messages from, and send messages to, a cellular wireless network. In the illustrated examples described herein, the wireless communication subsystem 1018 can be configured in accordance with the IEEE® 802.11 standard. In other example implementations, the wireless communication subsystem 1018 can be implemented using a BLUETOOTH® radio, a ZIGBEE® device, a wireless USB device, or an ultra-wideband (UWB) radio.

To enable a user to use and interact with or via the wireless terminal 114, the wireless terminal 114 is provided with a speaker 1020, a microphone 1022, a display 1024, and a user input interface 1026. The display 1024 can be an LCD display, an e-paper display, etc. The user input interface 1026 could be an alphanumeric keyboard and/or telephone-type keypad, a multi-direction actuator or roller wheel with dynamic button pressing capability, a touch panel, etc. In the illustrated example, the wireless terminal 114 is a battery-powered device and is, thus, provided with a battery 1028 and a battery interface 1030.

Figure 11:
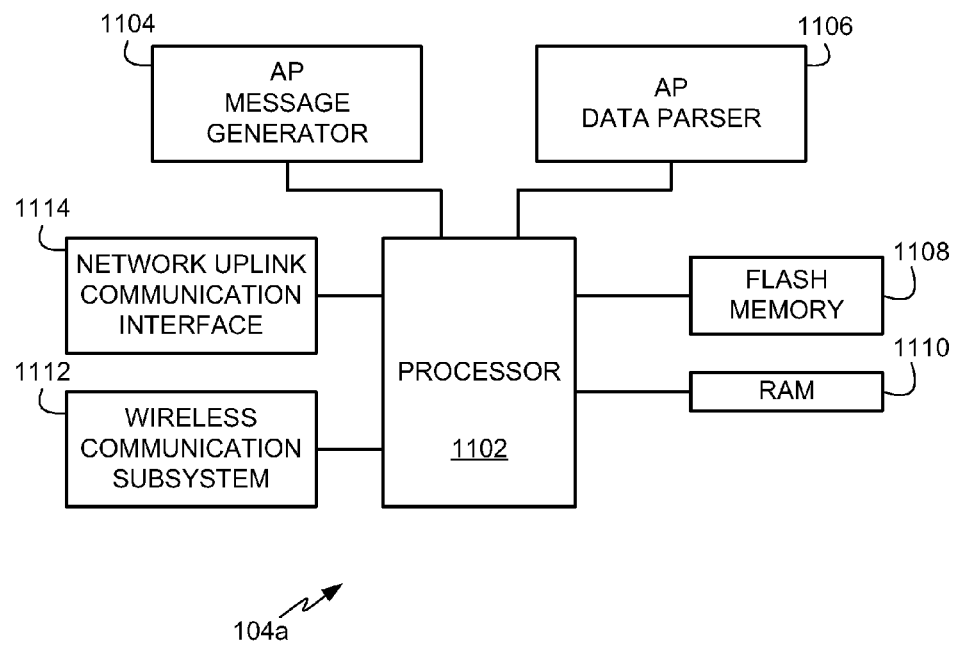
FIG. 11 depicts an example wireless access point that may be used to implement the example methods and apparatus described herein.

Turning now to FIG. 11, the example AP 104a of FIGS. 1, 6, and 9 is shown in block diagram form. The example AP 104a includes a processor 1102 to perform the overall operations of the AP 104a. In addition, the AP 104a includes an AP message generator 1104 to generate query and/or response messages and an AP data parser 1106 to retrieve information from received data frames. The AP message generator 1104 is substantially similar to the terminal message generator 1004 of FIG. 10, and the AP data parser 1106 is substantially similar to the terminal data parser 1006 of FIG. 10. Thus, the AP message generator 1104 and the AP data parser 1106 may be implemented in the processor 1102 and/or a wireless communication subsystem (e.g., a wireless communication subsystem 1112) using any combination of hardware, firmware, and/or software including instructions stored on a computer-readable medium.

The example AP 104a also includes a FLASH memory 1108 and a RAM 1110, both of which are coupled to the processor 1102. The FLASH memory 1108 may be configured to store required AuPs from the AuP data structure of FIG. 300, supported capability indicators from the BSS capabilities data structures 400 or 700, and supported AI types from the data structures 500 or 800.

To communicate with wireless terminals such as the wireless terminal 114, the AP 104a is provided with a wireless communication subsystem 1112, which may be substantially similar or identical to the wireless communication subsystem 1018 (FIG. 10) of the wireless terminal 114. To communicate with a WLAN-supported network (e.g., the networks 106a-b, 110, and 108a-b), the AP 104a is provided with a network uplink communication interface 1114.

Figure 12:
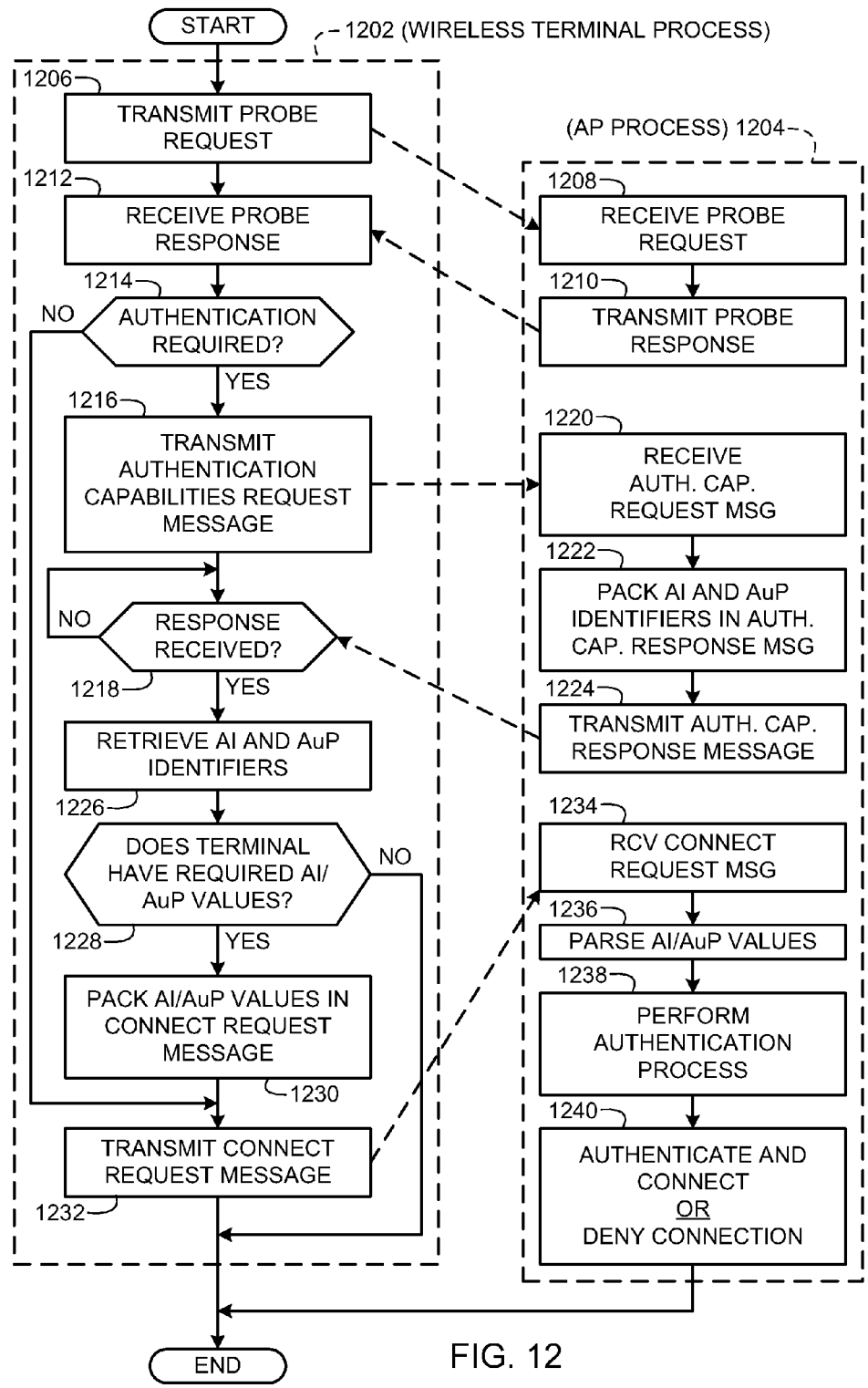
FIG. 12 depicts an example flow diagram representative of computer readable instructions that may be used to discover authentication information in a wireless network.

FIG. 12 depicts an example flow diagram representative of computer readable instructions that may be used to discover AuPs associated with accessing a WLAN-supported network (e.g., the networks 106a-b, 108a-b, and 110 of FIG. 1). The example operations of FIG. 12 may be performed using a processor, a controller and/or any other suitable processing device. For example, the example operations of FIG. 12 may be implemented using coded instructions stored on a tangible medium such as a flash memory, a read-only memory (ROM) and/or random-access memory (RAM) associated with a processor (e.g., the processor 1002 of FIG. 10 and/or the processor 1102 of FIG. 11). Alternatively, some or all of the example operations of FIG. 12 may be implemented using any combination(s) of application specific integrated circuit(s) (ASIC(s)), programmable logic device(s) (PLD(s)), field programmable logic device(s) (FPLD(s)), discrete logic, hardware, firmware, etc. Also, some or all of the example operations of FIG. 12 may be implemented manually or as any combination(s) of any of the foregoing techniques, for example, any combination of firmware, software, discrete logic and/or hardware. Further, although the example operations of FIG. 12 are described with reference to the flow diagram of FIG. 12, other methods of implementing the operations of FIG. 12 may be employed. For example, the order of execution of the blocks may be changed, and/or some of the blocks described may be changed, eliminated, subdivided, or combined. Additionally, any or all of the example operations of FIG. 12 may be performed sequentially and/or in parallel by, for example, separate processing threads, processors, devices, discrete logic, circuits, etc.

In general, the example flow diagram of FIG. 12 can be used to implement the example messaging exchange process 600 of FIG. 6 and/or the example messaging exchange process 900 of FIG. 9 during a WLAN discovery process. The example flow diagram of FIG. 12 includes a wireless terminal process 1202 and an AP process 1204. The wireless terminal process 1202 can be implemented using the wireless terminal 114 (FIGS. 1, 6, 9, and 10) to query the AP 104a to discover AuPs required by the AP 104a. The AP process 1204 can be implemented using the AP 104a (FIGS. 1, 6, 9, and 11) to transmit the AI and/or AuPs required by the AP 104a.

Turning in detail to FIG. 12, initially, the wireless terminal 114 transmits a probe request (block 1206) via the wireless communication subsystem 1018. In the illustrated example, the probe request is used to query the AP 104a on whether it supports interworking with external networks (e.g., the networks 106a-b, 108a-b, and 110). The AP 104a receives the probe request (block 1208) via the wireless communication subsystem 1112 and transmits a probe response (block 1210) to indicate whether it supports interworking with external networks and whether it requires authentication.

The wireless terminal 114 receives the probe response (block 1212) via the wireless communication subsystem 1018 and the terminal data parser 1006 (FIG. 1) parses the probe response to determine whether authentication is required (block 1214). For example, the probe response may include an Additional Step Required for Access (ASRA) bit field (e.g., an authentication required bit field) (not shown) to indicate whether authentication is required. When authentication is required (block 1212) (e.g., the ASRA bit field is true), the wireless terminal 114 transmits an authentication capabilities request message (block 1216) (e.g., one of the queries 602 of FIG. 6 or 902 of FIG. 9) using, for example, a GAS query. The wireless terminal 114 then waits until it receives a response (block 1218).

The AP 104*a* receives the authentication capabilities request message (block 1220), and the AP message generator 1104 (FIG. 11) packs or inserts the required AI and AuP identifiers in an authentication capabilities response message (block 1222) (e.g., one of the capabilities responses 604 of FIG. 6 or 904 of FIG. 9). The AI and AuP identifiers associated with the AP 104*a* may be stored in a memory (e.g., one of the flash memory 1108 or the RAM 1110 of FIG. 11) of the AP 104*a*. The AP 104*a* then transmits the authentication capabilities response message (block 1224).

If the example method of FIG. 12 is implemented using the AI discovery technique described above in connection with FIGS. 4-6, the authentication capabilities request message of block 1216 is the capabilities query 602 of FIG. 6, the authentication capabilities response message of block 1222 is the capabilities response 604 of FIG. 6, and the authentication capabilities response message is implemented using the format of the layer-2 authentication type information frame 610 of FIG. 6. If the example method of FIG. 12 is implemented using the AI discovery technique described above in connection with FIGS. 7-9, the authentication capabilities request message of block 1216 is the capabilities query 902 of FIG. 9, the authentication capabilities response message of block 1224 is the capabilities response 904 of FIG. 9, and the authentication capabilities response message is implemented using the format of the layer-2+ authentication type information frame 906 of FIG. 9.

When the wireless terminal 114 receives the authentication capabilities response message (block 1218), the terminal data parser 1006 (FIG. 10) retrieves the AI and AuP identifiers from the received message frame (block 1226). If the wireless terminal 114 determines that it has the required AI and/or AuP values indicated by the received AI and AuP identifiers (block 1228), the terminal message generator 1004 (FIG. 10) packs or inserts the AI and/or AuP values in a connect request message (block 1230). For example, the wireless terminal 114 can execute one or more authentication value retrieval process that perform operations at the MAC sub-layer 204 to retrieve the AI and/or AuP values without needing to allow the authentication value retrieval process(es) to perform operations at or above an internet protocol (IP) layer (e.g., the network layer 208 of FIG. 2) nor needing to otherwise provide the authentication value retrieval process(es) with access to the IP layer.

In some example implementations, when the wireless terminal 114 determines at block 1228 that it has the required AI and/or AuP values, a user may be prompted with the SSID (or HESSID) associated with the AP 104*a* before generating the connect request message. In this manner, the user may be given the option of whether to connect to the AP 104*a* instead of allowing the wireless terminal 114 to automatically connect to the AP 104*a*. In some example implementations, if the wireless terminal 114 determines at block 1228 that it does not have the required AI and/or AuP values, the wireless terminal 114 (e.g., the processor 1002 of FIG. 10) can refrain from displaying the SSID (or HESSID) associated with the AP 104*a*. In this manner, the private network 106*a* is not shown as available for connecting since the wireless terminal 114 would not be able to connect to it without the required AI and/or AuP values. In addition, in some example implementations, the wireless terminal 114 can be configured to store the AI and AuP identifiers obtained at block 1226 in connection with an SSID of the AP 104*a* as a profile for the AP 104*a*. In this manner, when the wireless terminal 114 subsequently re-discovers the presence of the AP 104*a*, the wireless terminal 114 may use the stored AI and AuP identifiers to determine the AI and/or AuP values that it must provide to the AP 104*a* to be authenticated without having to re-request required AI and/or AuPs from the AP 104*a*.

After the AI and/or AuP values are packed or inserted into a connect request message (block 1230) or if the wireless terminal 114 determined at block 1214 that the AP 104*a* does not require authentication, the wireless terminal 114 transmits the connect request message (block 1232). After the AP 104*a* receives the connect request message (block 1234), the AP data parser 1106 (FIG. 11) parses the AI and/or AuP values from the connect request message (block 1236) and the AP 104*a* (or another system or computer networked to the AP 104*a*) performs an authentication process (block 1238). The AP 104*a* then authenticates and establishes a connection to the wireless terminal 114 or denies a connection to the wireless terminal 114 based on whether the AI and/or AuP values provided by the wireless terminal 114 were satisfactory for authentication.

After the AP 104*a* connects to the wireless terminal 114 or denies the connection (block 1240), or if the wireless terminal 114 determines that it does not have the required AI and/or AuP values, the example process of FIG. 12 ends.

Although certain methods, apparatus, and articles of manufacture have been described herein, the scope of coverage of this patent is not limited thereto. To the contrary, this patent covers all methods, apparatus, and articles of manufacture fairly falling within the scope of the appended claims either literally or under the doctrine of equivalents.

What is claimed is:

1. A method for a wireless device, the method comprising:
transmitting, during network discovery and prior to authentication, a Generic Advertisement Services (GAS) request to a network access point, the GAS request requesting authentication information, the authentication information being indicative of an extensible authentication protocol method and indicative of a credential required from a wireless terminal to use for authentication of the wireless terminal, the credential being indicative of a subscriber identity module credential; and
receiving, by the wireless terminal, a response to the GAS request from the network access point, wherein the response includes the authentication information.

2. The method of claim 1, wherein the credential is obtainable by the wireless terminal.

3. The method of claim 1, further comprising obtaining, by the wireless terminal, the credential by performing an operation at a media access control layer.

4. The method of claim 1, wherein the credential is pre-stored in the wireless terminal.

5. The method of claim 1 further comprising sending the credential to the network access point.

6. The method of claim 1 wherein the response includes second authentication information.

7. The method of claim 1, further comprising:
determining that the credential is located in the wireless terminal; and displaying a service identifier based on the credential being located in the wireless terminal.

8. The method of claim 1, wherein the wireless terminal is a mobile communication device.

9. The method of claim 1, wherein the credential enables access to a subscription service provider network communicatively coupled to the network access point.

10. An apparatus comprising:
a hardware processor configured to:
transmit, during network discovery and prior to authentication, a Generic Advertisement Services (GAS) request to a network access point, the GAS request requesting authentication information, the authentication information being indicative of an extensible authentication protocol method and indicative of a credential required from a wireless terminal to use for authentication of the wireless terminal, the credential being indicative of a subscriber identity module credential; and
receive a response to the GAS request from the network access point, wherein the response includes the authentication information.

11. The apparatus of claim 10, wherein the credential is obtainable by the wireless terminal.

12. The apparatus of claim 10, wherein the processor is further configured to obtain, by the wireless terminal, the credential by performing an operation at a media access control layer.

13. The apparatus of claim 10, wherein the processor is further configured to send the credential to the network access point.

14. The apparatus of claim 10, wherein the credential is locally stored in the wireless terminal.

15. The apparatus of claim 10, wherein the response includes second authentication information.

16. The apparatus of claim 10, wherein the processor is further configured to:
determine that the credential is located in the wireless terminal; and
display a service identifier based on the credential being located in the wireless terminal.

17. The apparatus of claim 10, wherein the credential enables access to a subscription service provider network communicatively coupled to the network access point.

* * * * *